(12) United States Patent
McClintic

(10) Patent No.: US 7,436,086 B2
(45) Date of Patent: Oct. 14, 2008

(54) METHODS AND APPARATUS FOR ADVANCED WIND TURBINE DESIGN

(76) Inventor: Frank McClintic, 1575 Priscilla Ct., Toms River, NJ (US) 08753

( * ) Notice: Subject to any disclaimer, the term of this patent is extended or adjusted under 35 U.S.C. 154(b) by 0 days.

(21) Appl. No.: 11/679,063

(22) Filed: Feb. 26, 2007

(65) Prior Publication Data
US 2007/0138798 A1    Jun. 21, 2007

Related U.S. Application Data

(63) Continuation of application No. 11/190,687, filed on Jul. 27, 2005, now Pat. No. 7,183,664.

(51) Int. Cl.
F03B 9/00    (2006.01)
(52) U.S. Cl. .................. 290/55; 290/44; 60/398
(58) Field of Classification Search .............. 290/43, 290/44, 54, 55; 60/398
See application file for complete search history.

(56) References Cited

U.S. PATENT DOCUMENTS

| | | | | |
|---|---|---|---|---|
| 4,055,950 | A | | 11/1977 | Grossman |
| 4,206,608 | A | * | 6/1980 | Bell ........................... 60/698 |
| 4,239,977 | A | * | 12/1980 | Strutman .................... 290/44 |
| 4,274,010 | A | * | 6/1981 | Lawson-Tancred .......... 290/55 |
| 4,355,956 | A | | 10/1982 | Ringrose et al. |
| 4,372,732 | A | * | 2/1983 | Browning .................... 416/14 |
| 4,498,017 | A | | 2/1985 | Parkins |
| 4,503,673 | A | | 3/1985 | Schachle et al. |
| 4,792,700 | A | | 12/1988 | Ammons |
| 4,815,936 | A | * | 3/1989 | Stoltze et al. ................. 416/9 |
| 5,140,170 | A | * | 8/1992 | Henderson ................... 290/44 |
| 5,495,128 | A | | 2/1996 | Brammeier |
| 6,748,737 | B2 | | 6/2004 | Lafferty |
| 6,911,743 | B2 | * | 6/2005 | Ishizaki ....................... 290/55 |
| 7,183,664 | B2 | * | 2/2007 | McClintic ..................... 290/55 |

OTHER PUBLICATIONS

International Search Report from International Application No. PCT/US2006/028905; dated Oct. 10, 2007; pp. 1-3.
Written Opinion of the International Searching Authority from International Application No. PCT/US2006/028905; dated Oct. 10, 2007; pp. 1-4.

* cited by examiner

*Primary Examiner*—Nicholas Ponomarenko
(74) *Attorney, Agent, or Firm*—Straub & Pokotylo; Michael P. Straub

(57) ABSTRACT

A wind turbine system includes a variable blade assembly including adjustable sails and wing shaped masts expanding the wind velocity capture envelope. The blade assembly turns a hydraulic pump, which pressurizes fluid and stores the pressurized fluid in a chamber in the support tower. Pressurized fluid is directed via an electronically controllable proportioning valve to a hydraulic motor which is coupled to an electric generator. A computer control module operates the proportioning valve regulating pressure to the hydraulic motor, maintaining generator rotational speed, and providing consistent output frequency to the power grid. Stored energy in the high pressure tank is used to continue generator operation after the winds cease, allowing early warning notification to the power management system of impending power loss. Residual pressure maintained in the high pressure tank allows restart operations via hydraulic pressure rather than power grid energy drain. On site high energy capacitors store additional energy.

20 Claims, 11 Drawing Sheets

METHODS AND APPARATUS FOR ADVANCED WIND TURBINE DESIGN

RELATED APPLICATIONS

The present application is a continuation of U.S. patent application Ser. No. 11/190,687 which was filed on Jul. 27, 2005 now U.S. Pat. No. 7,183,664 and which is hereby expressly incorporated by reference.

FIELD OF THE INVENTION

The present invention relates to alternative energy sources, and more particularly, to methods and apparatus for advanced wind turbine design.

BACKGROUND

Current wind turbine designs typically utilize direct drive generators or gear driven generators coupled to the wind turbine shaft. In such designs, there is an inherent problem in that as the wind speed varies the output frequency of the generator will also vary. However, for the generator output to be usable by the power grid, the output signal needs to be converted to match the power grid frequency, which is 60 Hz in the United States and 50 Hz in Europe. Typically, an additional frequency conversion stage is used to convert from the variable wind turbine generator output frequency to the constant grid frequency. Such an additional frequency conversion stage can include invertors and/or other phase correction circuitry. Such conversion stages can be costly and complex to implement and maintain. In addition, there is an inherent inefficiency which results in the frequency conversion process resulting in lost energy. It would be desirable if new methods and apparatus for wind turbine designs resulted in the generator output frequency being controlled to match the power grid frequency without the need for an additional frequency conversion stage.

Current wind turbines designs which connect to a power grid provide no or very limited warning of the loss of output due to unfavorable wind conditions. Loss of generator output can be due to low wind or no wind conditions resulting in insufficient wind energy to continue to drive the turbine. Loss of generator output can also be due to high wind conditions which could overstress the wind turbine elements if the wind turbine operation was allowed to continue, and thus the wind turbine is typically intentionally taken off-line during the interval of detected high winds to prevent damage to the wind turbine. Inconsistencies of the wind turbine generator output power level and rapid cutoffs result in balancing problems from the perspective of power grid management. Under such conditions, the power grid has a very small amount of time to locate and bring on line alterative sources of power to continue to balance the grid, regulate voltage levels within an acceptable band, prevent line voltage sags/spikes in order to continue to meet customer energy requirements and/or maintain an acceptable quality of service. It would be desirable if new methods and apparatus for wind turbine designs resulted in the wind turbine generator output being controlled to provide a more uniform power output level irrespective of changing wind conditions. It would also be beneficial if new methods and apparatus of wind turbine designs provided for more gradual degradations in energy output levels and/or provided earlier warnings to the power grid of an impending loss of output power.

Following a shutdown, current wind generator turbines typically need to use electricity/power from the grid to reinitialize themselves and get back in operation. In many cases, a low velocity wind does not provide enough energy to start the rotation of the wind turbine so power from the grid is needed to drive a motor to start the spinning. Wind turbine start-up energy requirements place additional loads on the power grid. In a grid coupled to a larger number of similar or identical wind turbines in the same general area subject to the approximately the same wind conditions, it would not be unusual for many of these wind generator turbines to try to start up at approximately the same time, thus placing a substantial short term additional load on the grid. In view of the above, it would be advantageous if the methods and apparatus were developed which allowed the wind turbine generates to start up under their own power, following an interruption due to wind conditions, thus removing the start-up loading burden placed on the grid, which draws energy from the grid and tends to upset grid power balancing management.

Another problem facing current wind turbines is that the energy absorption bandwidth is typically rather narrow. Most current wind turbines are shut down at wind velocities which are either too low or too high. A typical wind velocity bandwidth for existing wind turbine systems is approximately 9 mph to 25 mph. It would be beneficial if new methods and apparatus of wind turbine designs expanded the energy absorption bandwidth allowing the wind turbine to continue to absorb wind energy for lower and/or higher wind velocities than current systems, thus capturing more wind energy on average over time.

Current wind turbines have turbine blades, which are designed to produce energy in a 9 mph to 25 mph band. In order to produce energy in low velocity winds the blades can be variable pitch blades, which allow for the capture of energy at low wind speeds. In order to be able to catch the low velocity wind energy and operate the turbine, the turbine blade area has to be sufficiently large. However, implementing a large turbine blade area designed to accommodate the capture of wind energy at relatively low wind velocities becomes a detriment to the capture of wind energy at relatively high wind velocities, as the larger size blades increase the likelihood of potential structural failure at the high wind velocities. Therefore, with such an implementation using larger size turbine blades to capture energy from low velocity winds, the wind turbine is required to be shutdown at a lower upper wind velocity limit to prevent potential structural damage. In view of the above it would be advantageous if new methods of apparatus of wind turbine design are adaptive to accommodate the unique design requirements at both the low velocity end and high velocity end.

Current wind turbines have very limited or no energy storage capability. Intervals of high wind energy capture time due to favorable wind conditions within the energy absorption band typically do not correspond to customer power level requirements. The excess energy is typically either wasted, e.g., burned off by a power consuming activity of the wind turbine, or dumped into the grid with the grid power management adjusting energy input from another source, e.g., decreasing energy output at fossil fuel power plant, to accommodate for the increased energy from the wind source. Even small improvements in wind turbines can lead to significant energy efficiencies and corresponding environmental benefits. Accordingly, it would be advantageous if methods and apparatus of wind turbines were developed so that the wind turbines included significant energy storage capability. In addition, it would be highly desirable if the range of wind speeds at which turbines could be used to produce power could be increased.

SUMMARY OF THE INVENTION

The present invention is directed to methods and apparatus of advanced wind turbine design, control, and energy storage. Various features of the present invention may be deployed alone or in combination.

One feature of various embodiments of the present invention is that the wind turbine system includes a wind turbine blade assembly which is coupled to a hydraulic pump, e.g., directly, thru a gearbox, or thru a transmission assembly. In some such embodiments, the tower upon which the wind turbine blade assembly and/or hydraulic pump is mounted is a hollow tower, e.g. metallic steel chamber, which includes a high pressure vessel into which the wind turbine driven hydraulic pump sends the pressurized hydraulic fluid to the high pressure vessel, e.g., reservoir. The pressure vessel may be an integral part of the tower support structure. The tower can also include a low pressure feed reservoir, e.g., in its base. In some embodiments, the low pressure feed reservoir may be part of a separate structure, e.g., a base structure or an in-ground tank. The low pressure inlet side of the hydraulic pump can be fed from the low pressure tank via a feed tube which is located internal to or adjacent to the tower. The high-pressure fluid output from the hydraulic pump is used to power a hydraulic motor, which is coupled to an electric generator. A hydraulic proportional control valve controls the speed/rpm at which hydraulic motor is turned which in turn controls the speed/rpm at which the generator is turned. Operating under the direction of a computer control module processing input from sensors, the proportioning control valve is computer controlled so that the frequency of the generated electricity will match the grid frequency specifications thus making the generated power directly usable and eliminating the need for invertors or other electronic means to convert the generated power signals to the grid frequency.

In accordance with some embodiments of the present invention, the volume of high pressure tank is such that the process described above will allow for the storage of energy, e.g., excess capacity energy, in the high pressure tank such that operation of the hydraulic motor, and the generation of electricity can continue for an extended period of time after the wind turbine blades have stopped spinning, e.g., due to insufficient wind speed. The hydraulic motor continues to operate driving the generator and generating electricity while the pressure level in the high pressure tank slowly decreases. This feature of the present invention allows the output of power from the wind turbine system for some time after the wind sensor will have notified the grid of an impending loss of power do to high or low wind velocity. This extended time period of electrical output allows for notification to the grid of a power generation loss in that the wind turbine system, which has now become an energy storage medium which is being depleted. This early notification feature allows for the power grid management system to accommodate for an impending loss of wind source power onto the grid by preparing to adjust other power sources, e.g. fossil fuel power source, output levels. The wind turbine system can, and in various embodiments does, notify the power management system in advance of the point in time when the wind turbine system will cut off the electrical output to the grid. The wind turbine system can, and in various embodiments does, notify the power management system in advance of the point in time when the wind turbine system will reconnect to the grid to deliver energy.

In accordance with another feature of various embodiments of the present invention, the stored energy in the form of hydraulic pressure is allowed to be reduced to a point, but not beyond such a point, where the sensors indicate that there is enough reserve capacity left in the pressurized hydraulic fluid such that a restart the wind turbine. Then when wind conditions permit restarting of the turbine is implemented by using the remaining hydraulic pressure to restart the hydraulic pump and start the turbine blade assembly spinning. This approach of the present invention of using stored hydraulic pressure to restart the wind turbine removes the load demands typically placed on the power grid to restart a wind turbine system. When wind conditions permit and the computer control system decides to initiate a restart operation, the reserve capacity then be rerouted thru the hydraulic system so that the hydraulic pump is temporarily turned into a motor to bring the turbine up to the minimum required speed, which will restart the energy production cycle. The high pressure fluid or a regulated level thereof can be rerouted to the low pressure feed tube via a computer controlled primer valve. The low pressure feed tube can include a check valve to prevent the high pressure hydraulic fluid from entering the low pressure reservoir.

In some embodiments, of the wind turbine system described above, the hydraulic system included as part of the wind turbine system does not require any minimum rotor speed to produce or store energy i.e., stored fluid under pressure can be used to produce electric. In some such embodiments, the wind turbine system will pump hydraulic fluid into the reservoir until it is full at high pressure at which point the generator will be activated until it bleeds power/hydraulic fluid pressure down to the restart reserve level. In some embodiments, of the present invention, the computer control system will maintain pressure in the high pressure tank above the minimum restart level, and generator operation may be activated provided the level is above the minimum restart level. In some embodiments, during periods of excess energy generation from wind power, e.g., the power grid does not require the level of generator output energy at present, excess energy may be stored, e.g., by increasing hydraulic pressure in the high pressure tank and/or routing electrical energy to a electrical storage device or devices, e.g., capacitor and/or battery bank. In some embodiments, during periods where the energy level of generation wind power is lower than the level being extracted from the high pressure fluid, e.g., the power grid requires more output energy at present than the wind is producing, energy may be extracted from the pressurized fluid decreasing the pressure level in the high pressure tank.

In various embodiments, the wind turbine system is implemented using multiple hydraulic motors and/or multiple generators. In some such system, each hydraulic motor can be controlled independently via its own electronically controlled proportioning valve and feedback circuitry. In some such multiple hydraulic motor and/or multiple generator systems, different combination can be activated at different times to accommodate changing load requirements and/or changing wind conditions.

Another feature of some embodiments of the present invention is the use of adjustable sails in the blade assembly of the wind turbine system. In some such embodiments, the turbine blades have a roller reefing sail system or variation thereof, whereby the area of the blade/sail combination will be variable. In various embodiments including a controllable sail feature, the wind turbine system includes masts, e.g., carbon fiber masts, on a hub with electronically or hydraulically reefed sails. The wind turbine system includes, in various embodiments, a wind speed sensor and/or a wind direction sensor. When the wind speed sensor indicates a lower wind velocity condition the sail area can be controllably increased, when possible, by unfurling the roller reefed sails using hydraulic and/or electric powered motors or other mechanical means. Some embodiments include sensors to determine the position of the sails. When the wind speed rises the sails can be controllably drawn in or reefed. The sails are fully withdrawn into the masts at high wind velocity, where the additional sail area could result in structural damage to the wind turbine blade assembly.

Another feature of some embodiments of the wind turbine system is that the masts themselves are formed to have a mild wing shape. Some such masts are designed such that they can withstand and collect energy at projected wind velocities at the high end which far exceeds the wind capture high end velocities of typical fixed area blades conventionally used. For example a mast structure, in accordance with the present invention can have a smaller wind collection surface area than typical fixed area blades deployed since it can be used at the high velocity end but need not be relied upon to the be primary wind collection source at the low wind velocity end, where the sail dominates. In some such embodiments including a mild wing shaped mast, the mast structure also includes a twist. The implementation of the wing shaped mast and the adjustable sails would allow for much more energy production over the course of time by allowing for energy production over a much larger wind speed range than current designs. For example at very high wind levels, the wind shaped masts having comparatively small cross sectional area could capture high velocity wind energy, while at very low velocity wind levels the comparatively large cross sectional area provided by the unfurled sails could capture low velocity wind energy. Thus the wind velocity capture envelope, could, with such design features, of the present invention, be larger and expanded at both the low and high ends over convention designs.

As another feature of some embodiments of the present invention, in addition to the energy storage capacity in the high-pressure hydraulic fluid described above, some hydraulic fluid could be displaced in the tower structure for a high-energy capacitor. For example, in some such embodiments, a carbon nanotube capacitor with energy storage densities of 30 Kilowatt-Hours per kilogram is incorporated into the fluid bath, collocated with the tower or located near the tower, which provides for a much larger onsite energy storage solution. In one such embodiment, including a ten thousand pound capacitor of this type material, the wind turbine system could store energy such that a 4-Megawatt wind generator could continue to operate for 34 hours of extended output after the hydraulic motor drive has been shut off. This approach of the present invention can smooth the energy curve, improve the efficiency of a wind turbine system and/or allow for a larger amount of energy to be sent to the grid over time.

The above-described systems can include sensors, control systems, software and hardware, which can be modified for requirements based on the size and needs of the system. Some embodiments of the above wind turbine system include a computer control module which includes a processor, e.g., a CPU, memory, and interfaces. The memory includes routines and data/information. The processor executes the routines and uses the data information in memory to control the operation of the wind turbine system and implements the methods of the present invention. Some such functions performed by the computer control module may include, monitoring of wind speed and/or wind direction, monitoring and control of the position, e.g., heading the blade assembly, monitoring of the position of the sails and control of the sail deployment, monitoring and control of the hydraulic pump, monitoring and control of the hydraulic motor, control of the proportioning valve, control of the primer valve, control of restart sequences, monitoring of the pressures in the high and low pressure chambers, regulation of pressure, monitoring of generator output, switching of generator output to the grid and/or to electric storage devices, control of energy transfer from electric storage devices to the grid, communications and notifications to a management network, communications protocol operations, switching control of a plurality of hydraulic motors and/or generators, and/or fault detection monitoring, reporting, and/or shutdown operations.

The system of the present invention can have a relatively large sail (blade) surface areas even with blades having relatively small diameters, e.g., less than 300 feet and in some cases, e.g., diameters less than 50, 100, 200, or 250 feet, allowing the system to operate with smaller diameter blades compared to some known systems and/or at lower wind velocities. As a result of using smaller diameter blades the velocity of the blade tip as it rotates can be lower than known systems which have larger blade diameters. Since the noise generated by a windmill is in part a function of the velocity of blade tips as they rotate, it is possible to generate less noise using embodiments of the invention with shorter blade diameters than would be generated by existing systems with much larger blade diameters. Since noise is one reason people tend to object to windmills, the methods and apparatus of the present invention can prove beneficial in terms of noise reduction as compared to known systems.

Numerous additional features benefits and embodiments of the present invention are discussed in the detailed description which follows.

DETAILED DESCRIPTION

Figure 1:
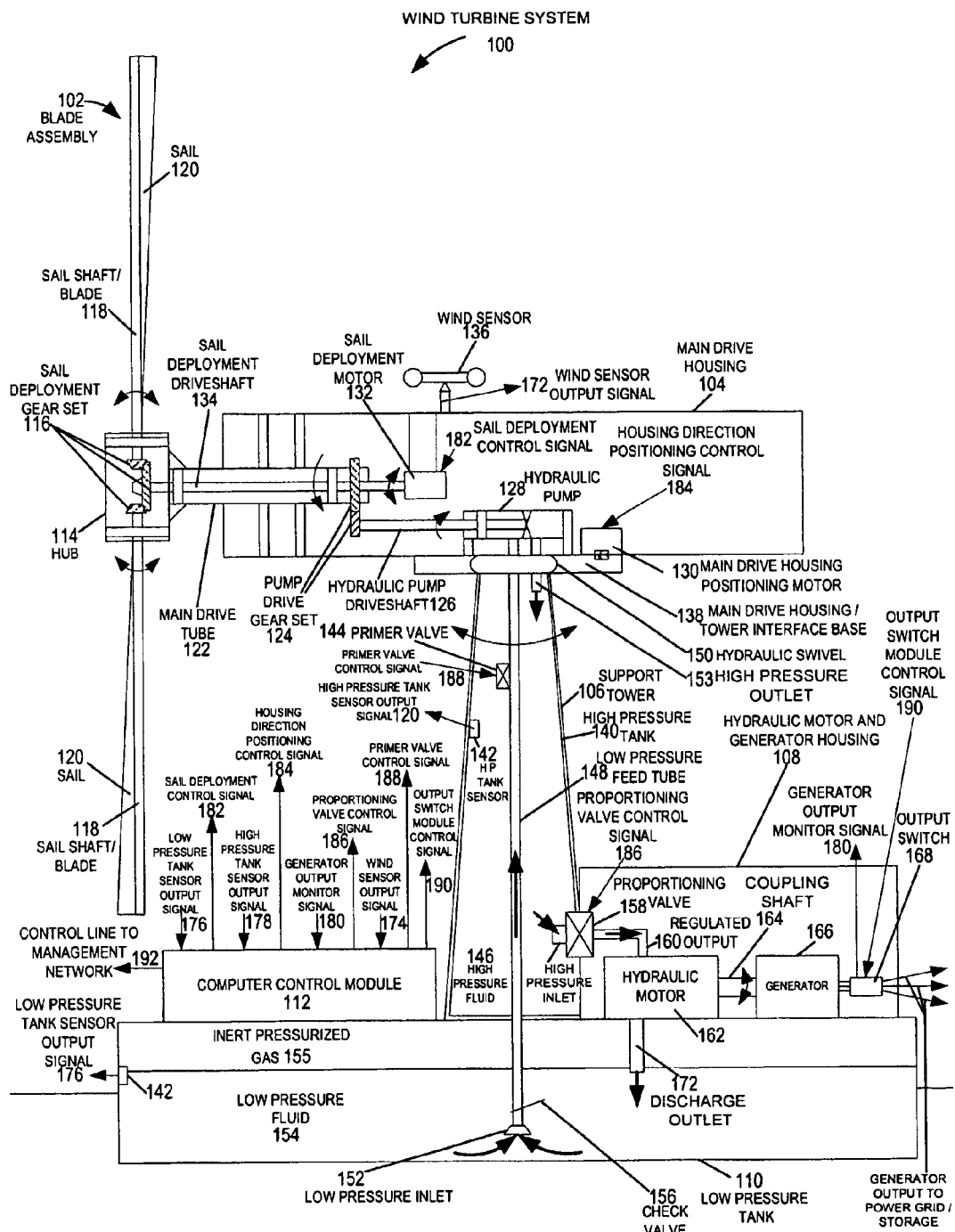
FIG. 1 is a drawing of an exemplary wind turbine system implemented in accordance with the present invention and using methods of the present invention.

FIG. 1 is a drawing of an exemplary wind turbine system 100 implemented in accordance with the present invention and using methods of the present invention. Exemplary wind turbine system 100 includes a blade assembly 102, a main drive housing 104, a support tower 106, a hydraulic motor and generator housing 108, a low pressure tank 110, and a computer control module 112.

The blade assembly 102 includes a hub 114, a sail deployment gear set 116, a plurality of sail shafts/blades 118, and a plurality of retractable sails 120. The blade assembly 102 is used to capture wind energy. The blade assembly 102, in some embodiments includes a rolling reefing sail system, whereby the area of the sails is variably adjustable. The sail shaft/blades 118, e.g., carbon fiber masts, coupled to hub 114 are attached to the sail deployment gear set 116, and can be rotated to let out or retract the sails 120 which are attached to the sail shaft/blades 118. In some embodiments, sensors are employed in the blade assembly 102 to detect sail position. By adjusting the amount of exposed sail 120, the wind velocity band usable for energy production can be expanded over existing systems. At very low wind speed velocities, the sails 120 can be fully unfurled allowing the wind turbine 100 to capture energy at wind velocities below 9 mph, e.g., 4, 5 or 6 miles per hour. At very high wind velocities, the sails 120 can be fully reefed reducing stresses on the blade assembly 102. Sail shaft/blades 118 are constructed such that when the sails 120 are fully retracted the sail shaft/blades 118 have a mild wing shape capable of capturing high velocity wind energy and capable of withstanding the high velocity winds without structural damage. By incorporating such design features, in accordance with the present invention, the wind turbine 100 is able of capturing wind energy at wind velocities above 25 mph, 30, 35 or even 40 miles per hour. This variable sail area feature in combination with a wing shaped sail shaft/blades 118 allows for a larger wind speed range over existing designs, thus allowing for more energy production over the course of time by allowing for energy production over a larger wind speed range than current designs.

The main drive housing 104 includes a main drive tube 122, a pump drive gear set 124, a hydraulic pump driveshaft 126, a hydraulic pump 128, a main drive housing position motor 130, a sail deployment motor 132, and a sail deployment driveshaft 134. One end of the main drive tube 122 is coupled to the hub 114 of blade assembly 102 while at the other end of the main drive tube 122, a gear 124a attached to the main drive tube 122 meshes with a gear 124b attached to the hydraulic pump driveshaft 126. Main drive gear set 124 includes gears 124a and 124b. The main drive tube 122 is supported in the main drive housing 104 by support bearing assemblies. The hydraulic pump driveshaft 126 is coupled to the hydraulic pump 128. As wind energy is captured by the blade assembly 102, the sail shaft/blades 118 rotate about the center axis of the hub 114. As the hub 114 rotates, the main drive tube 122 rotates resulting in rotation of pump drive gear set 124 and rotation of hydraulic pump driveshaft 126. As the hydraulic pump driveshaft 126 rotates, the hydraulic pump 128 rotates generating hydraulic pressure.

The main drive tube 122 includes a hollow center core through which sail deployment driveshaft 134 is located. The sail deployment motor 132 is coupled to one end of the sail deployment driveshaft 134, while the other end of the sail deployment driveshaft is coupled to the sail deployment gear set 116. In some embodiments, the sail deployment motor 132 is an electric motor, while in other embodiments, the sail deployment motor is a hydraulic motor. The sail deployment motor 132 when controlled to engage and rotate causes the sail deployment driveshaft 134 to rotate, the controlled rotation being transferred via sail deployment gear set 116 such that the sail shaft/blades 118 are rotated and sail 120 is unfurled or retracted as commanded. In other embodiments, sail deployment motor or motors are mounted in the hub 114, in the sail/shaft blades 118, and/or attached to the sail/shaft blades 118.

Attached to the main drive housing 104 is a wind sensor 136. The wind sensor 136 detects and measures wind velocity and, in some embodiments, wind direction. In some embodiments, separate sensors are used to detect wind velocity and wind direction. When, the wind speed sensor 136 detects and indicates a lower wind velocity condition, the sail area can be controlled to be increased, when not fully unfurled, by controlling the sail deployment control motor 132 to increase the sail area by controllable unfurling the roller reefed sails. When, the wind speed sensor 136 detects and indicates a higher wind velocity condition, the sail area can be controlled to be decreased, when not fully retracted, by controlling the sail deployment control motor 132 to decrease the sail area by controllable drawing in or reefing the roller reefed sails.

The main drive housing 104 is mechanically coupled to support tower 106 via a main drive housing/tower interface base 138. The main drive housing/tower interface base 138 allow the main drive tower 104 to be controllably oriented to different headings so as to capture the prevailing winds and/or to place the blade assembly 102 in a shutdown mode with minimal stress on the blade assembly 102. The main drive housing positioning motor 130, e.g., an electric or hydraulic motor, is used to orient the main drive housing 104 heading.

Support tower 106 includes a high pressure tank 140, a high pressure tank sensor 142, and a primer valve 144. The high pressure tank 140 stores high pressure fluid 146. In some embodiments, the high pressure tank may also include a bellows assembly. A low pressure feed tube 148 is routed through or adjacent to the high pressure tank 140. At the bottom of the low pressure feed tube 148 is a low pressure inlet 152 which is situated in the low pressure tank 110 such that low pressure fluid 154 can be drawn into the low pressure feed tube. In some embodiments, an inert gas 155, e.g., nitrogen, under pressure is included in the low pressure tank 110, and the pressure of the inert gas aids in forcing the low pressure fluid 154 up the feed tube 148. At the top of the support tower 106 a hydraulic swivel 150 couples the high pressure low pressure feed tube 148 to the hydraulic pump 128 low pressure inlet port and couples the high pressure output of the hydraulic pump 128 to the high pressure tank 140. A high pressure outlet 153 discharges high pressure fluid from the hydraulic pump 128 into the high pressure tank 140.

The low pressure feed tube 148 includes a check valve 156. When re-starting the hydraulic pump 128 of the wind turbine 100, with a sufficient restart level of residual pressure having been intentionally maintained in the high pressure tank 140, the primer valve 144 is controlled to direct regulated high pressure fluid into the low pressure feed tube 148. Check valve 156 prevents the pressurized fluid from entering the low pressure tank 110. The pressurized fluid enters the inlet of the hydraulic pump, which now functions as a hydraulic motor to start the blade assembly 102 spinning. Then, the primer valve 144 is switched to seal off the high pressure chamber 140 form the low pressure feed tube 148, and the wind energy continues to spin the blade assembly 102 and the hydraulic pump 128 ceases to operate as a hydraulic motor and operates in an energy storage mode of operation increasing the pressure in the high pressure tank 140.

The hydraulic motor and generator housing 108 includes a proportioning valve 158, a regulated output line 160, a hydraulic motor 162, a coupling shaft 164, a generator 166, and an output switch 168. The proportioning valve 158 is coupled via a high pressure inlet 170 open to the high pressure tank 140. The proportioning valve 158 regulates the pressure level to maintain a consistent regulated pressure level, when possible, to drive the hydraulic motor 162 at a consistent speed. The output of the proportioning valve 158 is directed via regulated output line 160 which couples the proportioning valve 158 to an inlet of the hydraulic motor 162. The hydraulic motor 162 includes a discharge outlet 172 through which lower pressure fluid is discharged into the low pressure tank 110, stored energy having been extracted from the pressurized fluid when the hydraulic motor 162 was driven. The hydraulic motor 162 is coupled to generator 166 via coupling shaft 164, which in turn spins the generator 166 to produce electrical power. By spinning the hydraulic motor 162 at a constant controlled speed, the generator 166 is in turn spun at a constant controlled speed thus controlling and maintaining the frequency of the generated electric signal to be compatible with the power grid. The output of the generator 166, e.g., 3 phase output lines, is coupled to the input of output switch 168. The output of output switch 168 is coupled to the power grid and/or storage devices. The output switch 168 can be controlled to disconnect the generator from the power grid such that start-up and shut-down of the hydraulic motor and/or generator, during which the generator is being spun at a frequency outside the acceptable tolerances, does not introduce problematic signals into the power grid. In addition, the output switch 168 can be used to cut out the generator output, before the hydraulic motor 162 is turned off due to insufficient high pressure in the high pressure tank 140, and to reconnect the generator output to the power grid after start up has stabilized.

Low pressure tank 110 stores the low pressure fluid 154. The low pressure tank 110 also includes a low pressure tank sensor 155 which measures the pressure and/or fluid level in the low pressure tank 110. In some embodiments, the low pressure tank 110 also includes a bellows or float assembly.

Computer control module 112 includes interfaces to other networks, interfaces to sensors, and interfaces to control devices. Computer control module 112 includes a processor and memory. The memory includes routines and data/information. The processor, e.g., a CPU, executes the routines and uses the data/information in memory to control the operation of the wind turbine system 100 and implement the methods of the present invention. Various functions controlled by the computer control module 112 include wind measurements, blade assembly start-up operations, sail deployment control, main drive housing positioning control, pressure regulation control, primer valve operation, proportioning valve control, generator output monitoring, generator output switching, and signaling a management network of changing conditions. Various signals received by the computer control module 112 include wind sensor output signal 174, low pressure tank sensor output signal 176, high pressure tank sensor output signal 178 and generator output monitor signal 180. Other signals received by the computer control module 112 may include position indicator signals indicative of the sail deployment level and position indicator signals indicative of the direction of the main drive housing 104. Fault indication signals may also be received and processed by the computer control module 112. Various output signals generated by the computer control module 112 used to control operation of the wind turbine system 100 include said deployment control signal 182, housing direction positioning control signal 184, proportioning valve control signal 186, primer valve control signal 188, and output switch module control signal 190. The computer control module 112 also interfaces with a management network via signals over the control line to management network 192, both receiving commands, e.g., take wind turbine off-line, and sending notifications, e.g., wind-turbine to be taken off-line at a specified time.

Slip ring are provides at the main drive housing 104/main drive housing/tower interface base 138.

Wind measurements from sensor 136 can be performed, processed, and used by the computer control module 112 to predict how long operations can continue before insufficient wind energy input to keep up with output demand will force an energy output shutdown, and a cutoff of the generator output. Based on pressure measurements of high pressure sensor output signal 120, the computer control module can predict the remaining energy capacity. The computer control module 112 can notify the management network via control line 192 of conditions and give advance notice before stopping energy output to the grid.

Figure 2:
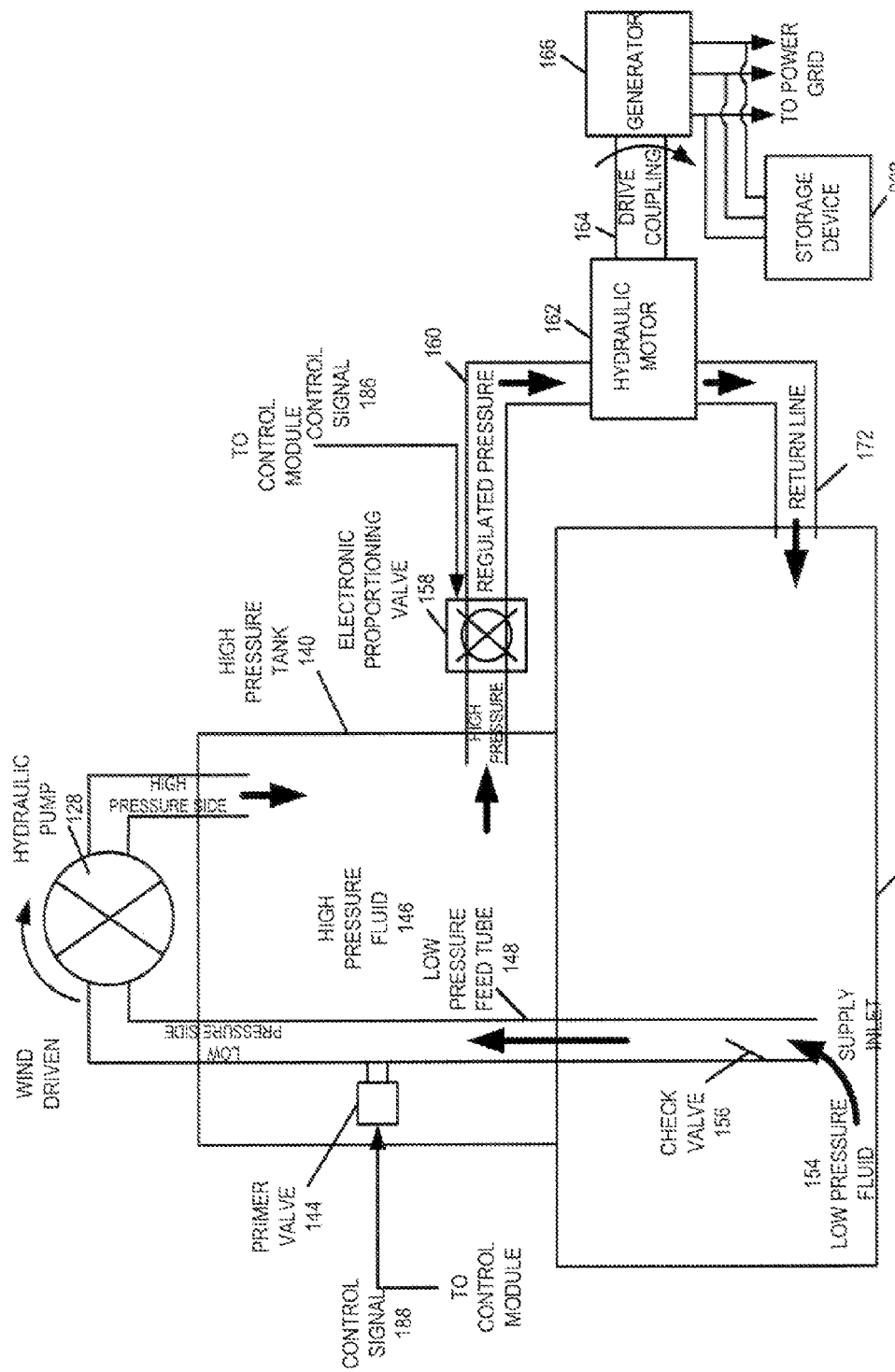
FIG. 2 is a functional drawing used to describe operations and flow in an exemplary wind turbine system during conditions where the blade assembly, which is capturing wind energy, is driving the hydraulic pump, and there is sufficient stored energy in the high pressure tank to drive the hydraulic motor in accordance with the present invention.

FIG. 2 is a functional drawing 200 used to describe operations and flow in the wind turbine system 100. Functional drawing 200 includes low pressure tank 110, high pressure tank 140, low pressure feed tube 148, hydraulic pump 128, primer valve 144, check valve 156, electronic proportioning valve 158, hydraulic motor 162, regulated pressure line 160, return line 172, drive coupling 164, generator 166 and storage device 202. Storage device 202 may include, e.g., invertors, filters and a bank of storage batteries. FIG. 2 illustrates operation of exemplary wind turbine system 100 during conditions where the blade assembly 102, which is capturing wind energy, is driving the pump 128, and there is sufficient stored energy in the high pressure tank 140 to drive the hydraulic motor 162 in accordance with the present invention.

The pump 128, driven by wind power captured by blade assembly 102, turns siphoning low pressure fluid 154 from low pressure tank 110 and generating hydraulic pressure. Low pressure fluid 154 is drawn up through the low pressure feed tube 148 through the check valve 156, which is open, and into the low pressure side of pump 128. Under these described operating conditions, primer valve 144 is controlled to be closed under the direction of the computer control module 112 via control signal 188. The pump 128 pressurizes the fluid with the high pressure side of the pump coupled to the high pressure tank 140.

The electronic proportioning valve 158 is controlled under the direction of the computer control module 112 via control signal 186 to regulate the pressure to the hydraulic motor 162 such that the hydraulic motor 162 will continue to spin at a controlled determined rotational rate. In some embodiments, a sensor may also be included to monitor the rate of rotation of the drive coupling 164 and to forward such information to the computer control module 112 to be used in closed loop control operations. High pressure fluid 146 enters the electronic proportioning valve 158, is regulated to become a regulated pressure fluid in line 160, the fluid then passes through hydraulic motor 162 spinning drive coupling 164 to drive the generator at a controlled rotational rate. This results in generator 166 producing electric energy at a constant frequency, e.g., 60 Hz or 50 Hz, which is output to the power grid and/or storage device 202. Discharge fluid from hydraulic motor 162 is returned to the low pressure tank 110 via return line 172.

If the pump 128 is producing more energy than consumed by hydraulic motor 162, e.g., due to favorable wind conditions, the pressure in high pressure tank can be allowed to increase within the safety margins of the high pressure tank 140, thus storing the excess energy for use later. If the pump 128 is producing less energy than currently consumed by hydraulic motor 162, then the pressure in high pressure tank 140 will decrease.

In accordance with one feature of various embodiments of the present invention, the pressure in the high pressure tank 140 is maintained to at least a minimal value needed to restart the hydraulic pump 128 after the blade assembly 102 has stopped. The electronic proportioning valve 158 under the direction of the control module 112 via control signal 186 shuts off flow to the hydraulic motor 162 before this minimal restart pressure level threshold is crossed.

Figure 3:
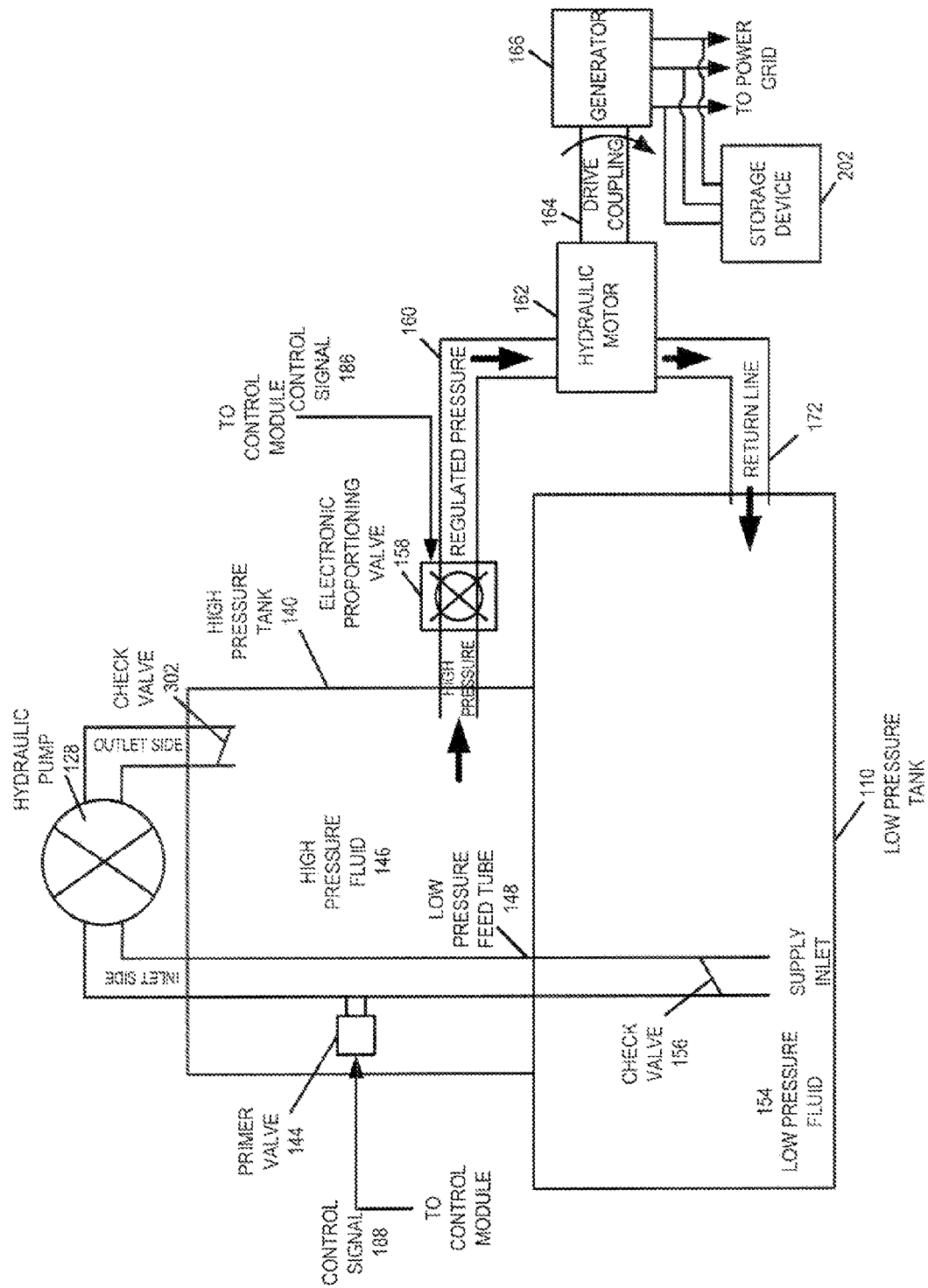
FIG. 3 is a functional drawing used to describe operations and flow in an exemplary wind turbine system during conditions where the blade assembly has stopped rotating and is no longer capturing wind energy; however, the high pressure tank has sufficient energy stored above the minimum level needed for a restart such that hydraulic motor operation and generator operation can continue in accordance with the present invention.

FIG. 3 is a functional drawing 300 used to describe operations and flow in the wind turbine system 100. Functional drawing 300 includes low pressure tank 110, high pressure tank 140, low pressure feed tube 148, hydraulic pump 128, primer valve 144, check valve 156, electronic proportioning valve 158, hydraulic motor 162, regulated pressure line 160, return line 172, drive coupling 164, generator 166, storage device 202 and check valve 302. FIG. 3 illustrates operation of exemplary wind turbine system 100 during conditions where the blade assembly 102 has stopped rotating and is no longer capturing wind energy; however, the high pressure tank has sufficient energy stored above the minimum level needed for a restart such that hydraulic motor 162 operation and generator 166 operation can continue. Hydraulic pump 128 is not rotating. Check valves 156 and 302 are closed, and primer valve 144 is also closed. The electronic proportioning valve 158 under the control of the computer control module 112 via control signal 186 continues to allow flow.

High pressure fluid 146 enters the electronic proportioning valve 158, is regulated to become a regulated pressure fluid in line 160, the fluid then passes through hydraulic motor 162 spinning drive coupling 164 to drive the generator at a controlled rotational rate. This results in generator 166 producing electric energy at a constant frequency, e.g., 60 Hz or 50 Hz, which is output to the power grid and/or storage device 202. Discharge fluid from hydraulic motor 162 is returned to the low pressure tank 110 via return line 172. During this mode of operation, the pressure level of the high pressure fluid gradually decreases. At a certain level, above the minimum pressure needed for a restart, the electronic proportioning valve is controlled via control signal 186 to stop flow through the hydraulic motor 162 and thus retain the pressure level in the high pressure tank.

Figure 4:
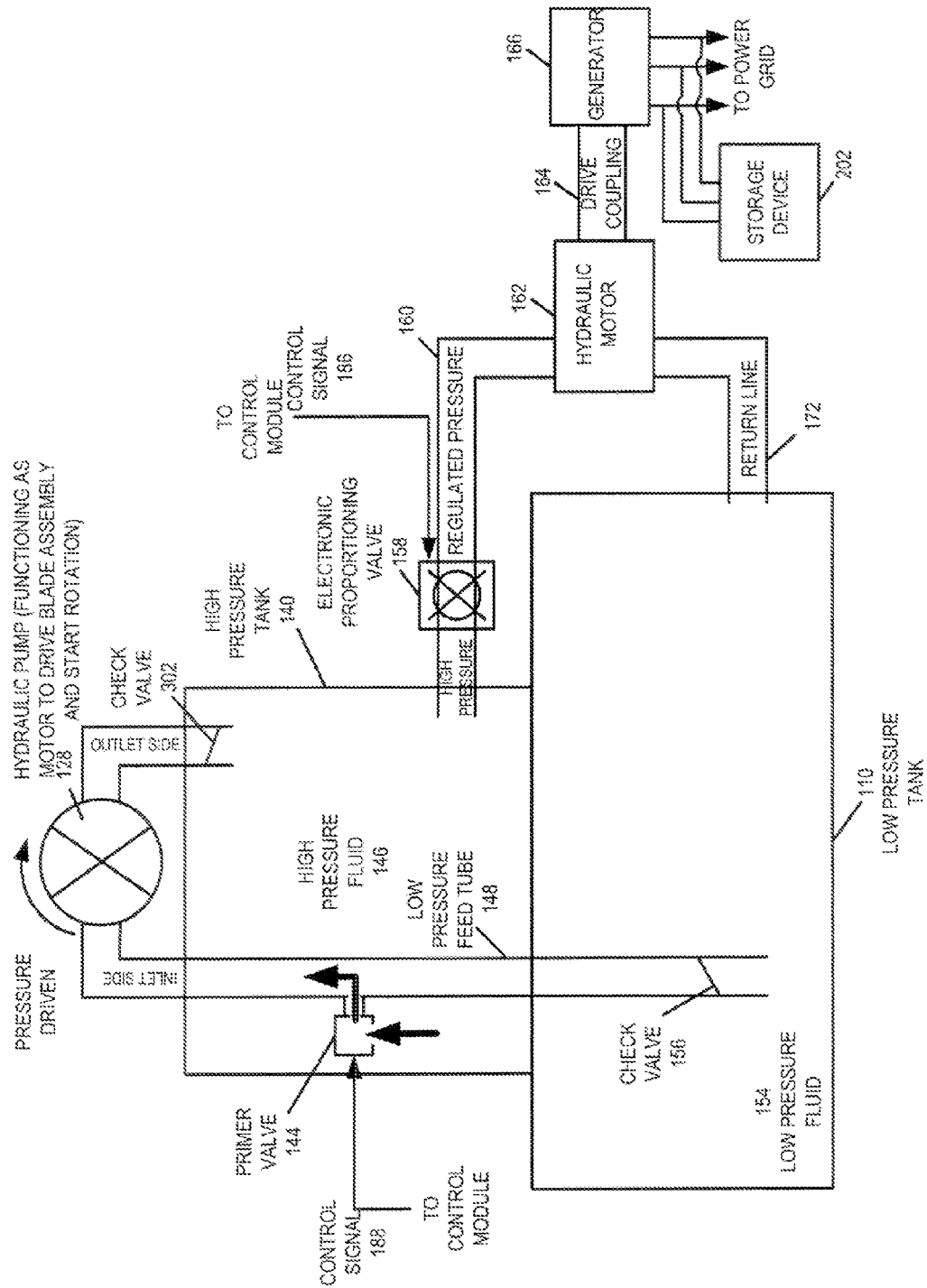
FIG. 4 is a functional drawing used to describe operations and flow in an exemplary wind turbine system during a restart operation of the blade assembly in accordance with the present invention.

FIG. 4 is a functional drawing 400 used to describe operations and flow in the wind turbine system 100. Functional drawing 400 includes low pressure tank 110, high pressure tank 140, low pressure feed tube 148, hydraulic pump 128, primer valve 144, check valve 156, electronic proportioning valve 158, hydraulic motor 162, regulated pressure line 160, return line 172, drive coupling 164, generator 166, storage device 202 and check valve 302. FIG. 4 illustrates operation of exemplary wind turbine system 100 during a restart operation of the blade assembly 102. Initially hydraulic pump 128 is not rotating. Primer valve 144 is controlled by the computer control module 112 via control signal 188 to open allowing high pressure fluid or some regulated level thereof to enter the low pressure feed tube 148. Check valve 156 is closed preventing the high pressure fluid from entering the low pressure tank 110. The high pressure fluid which passed through the primer valve 144 enters the inlet side of the pump 128, which at this time is functioning as a hydraulic motor. The pressure on the inlet side of the pump 128, causes the pump 128 to start to rotate, which in turn rotates the blade assembly 102, to which the pump 128 is mechanically connected. Having started the blade assembly 102 rotating, wind energy continues to keep the blade assembly 102 rotating. The primer valve 144 is controlled via control signal 188 to shut, and the hydraulic pump continues to rotate under wind energy with the pump 128 drawing low pressure fluid 154 through check valve 156, which now opens, pressurizing the fluid, and the high pressure fluid exits into the high pressure tank 140 through check valve 302, which now opens. The hydraulic pump 128, operating now under wind energy, continues to pump, increasing the pressure in high pressure tank 140. At some detected high pressure level, the computer control module 112 determines that pressure is sufficiently high for the hydraulic motor 162 to resume operations. The electronic proportioning valve 158 is controlled via signal 186 to open and send regulated pressure to the hydraulic motor 162. Once stabilized rotational operation has been achieved, the generator's output can be switched on to reconnect with the power grid/storage device 202.

Figure 5:
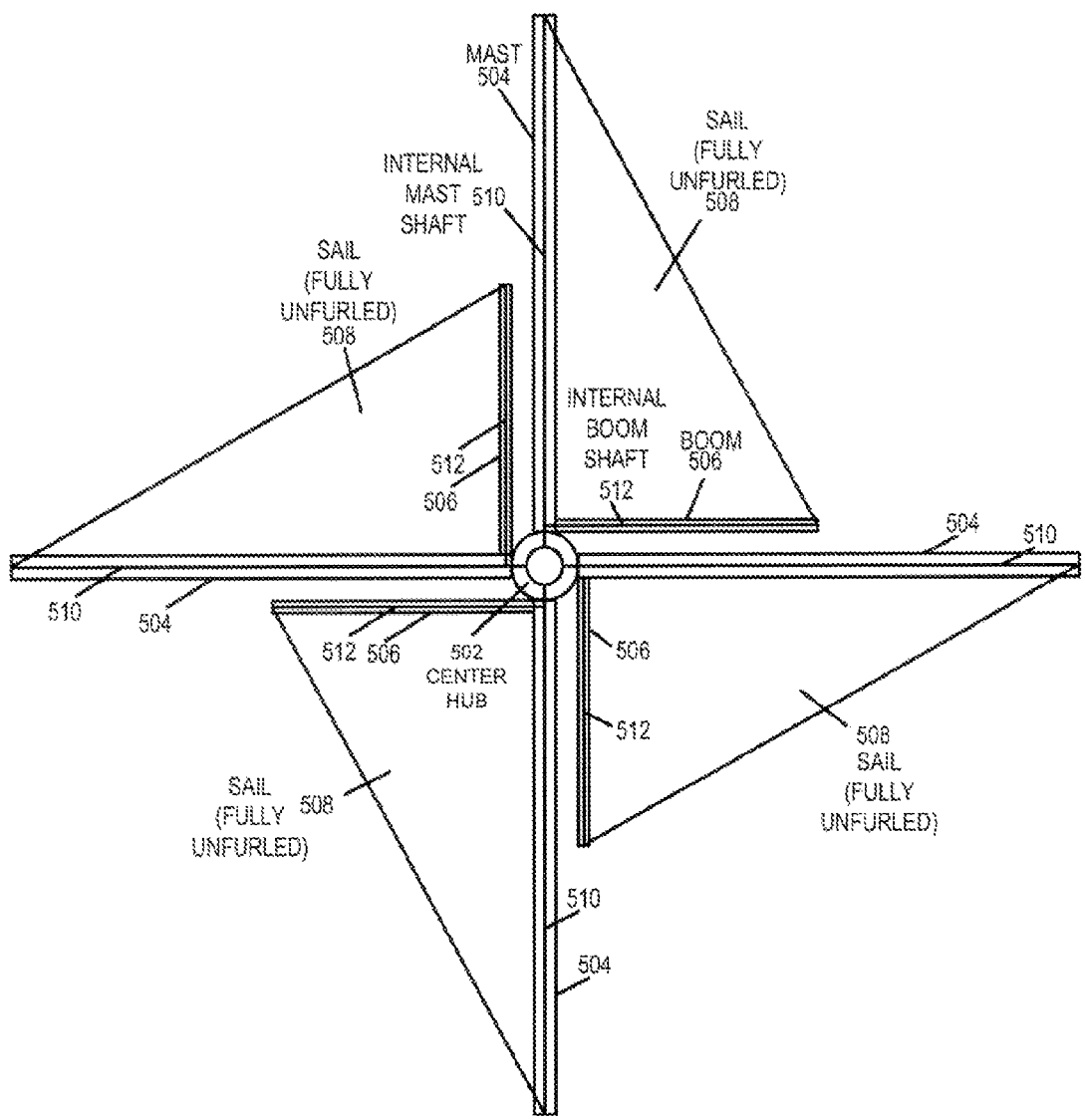
FIG. 5 is a drawing illustrating components in an exemplary blade assembly in accordance with the present invention.

FIG. 5 is a drawing illustrating components in an exemplary blade assembly 500 in accordance with the present invention. Exemplary blade assembly 500 may be blade assembly 102 of the exemplary wind turbine 100 of FIG. 1. Center hub 502 may be hub 114 including sail deployment gear set 116, while mast 504 and boom 506 may be sail/shaft blade 118, and sail 508 may be sail 120 of FIG. 1. Blade assembly 500 includes a plurality, e.g., four, sets of a mast 504, a boom 506, and a sail 508. Mast 504 includes an internal mast shaft 510, and boom 506 includes internal boom shaft 512. For a given set of mast 504, boom 506, and sail 508, the construction is such that the sail 508 can be rolled around one of the internal mast shaft 510 and the internal boom shaft 512, with the sail 508 being slid along the other shaft when the sail is being unfurled or reefed in. Sails 508 are constructed of flexible sail material that can be rolled up on a shaft, e.g., a boom internal shaft 512 or a mast internal shaft 510. Some masts 504 and/or booms 506 include slots into which the sail 508 can be retracted when being rolled up. Some masts 504 and/or booms 506 include slots along which the sail 508 or sail anchor slides when being unfurled or reefed in. In some embodiments, each sail 508 is rolled up/out along one of the shafts, e.g., a boom shaft 512, and pulled down/up the other shaft, e.g., a mast shaft 510. In some embodiments, some of the sails 508 are rolled up/out along internal mast shafts 510 and some of the sails 508 are rolled up/out along internal boom shafts 512.

FIG. 5 illustrates the condition where the sails 508 have been fully unfurled.

Figure 6:
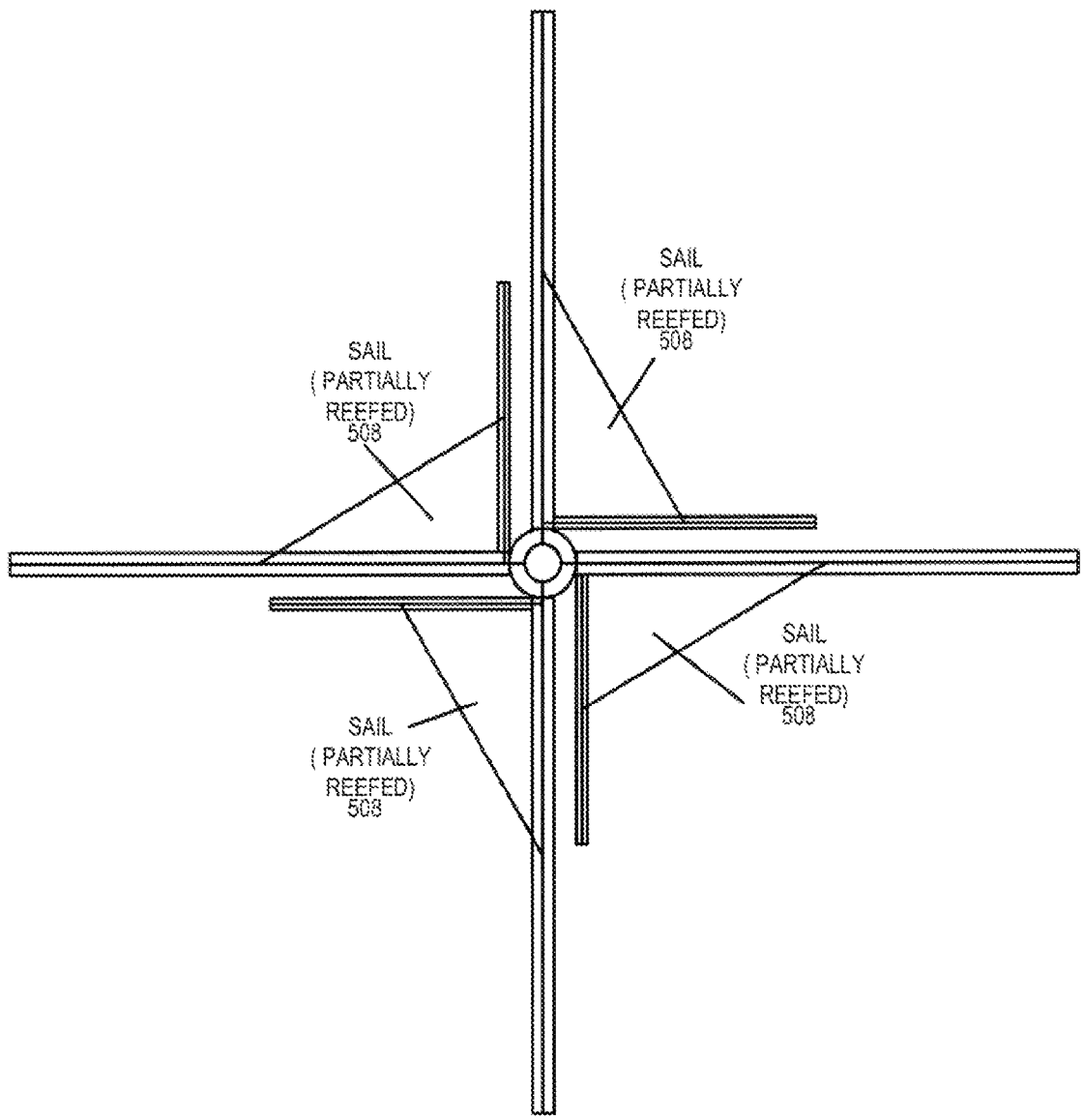
FIG. 6 is a drawing illustrating the exemplary blade assembly of FIG. 5 except showing the sails in a partially reefed in position.

FIG. 6 is a drawing 600 illustrating the exemplary blade assembly of FIG. 5 except showing the sails in a partially reefed in position.

Figure 7:
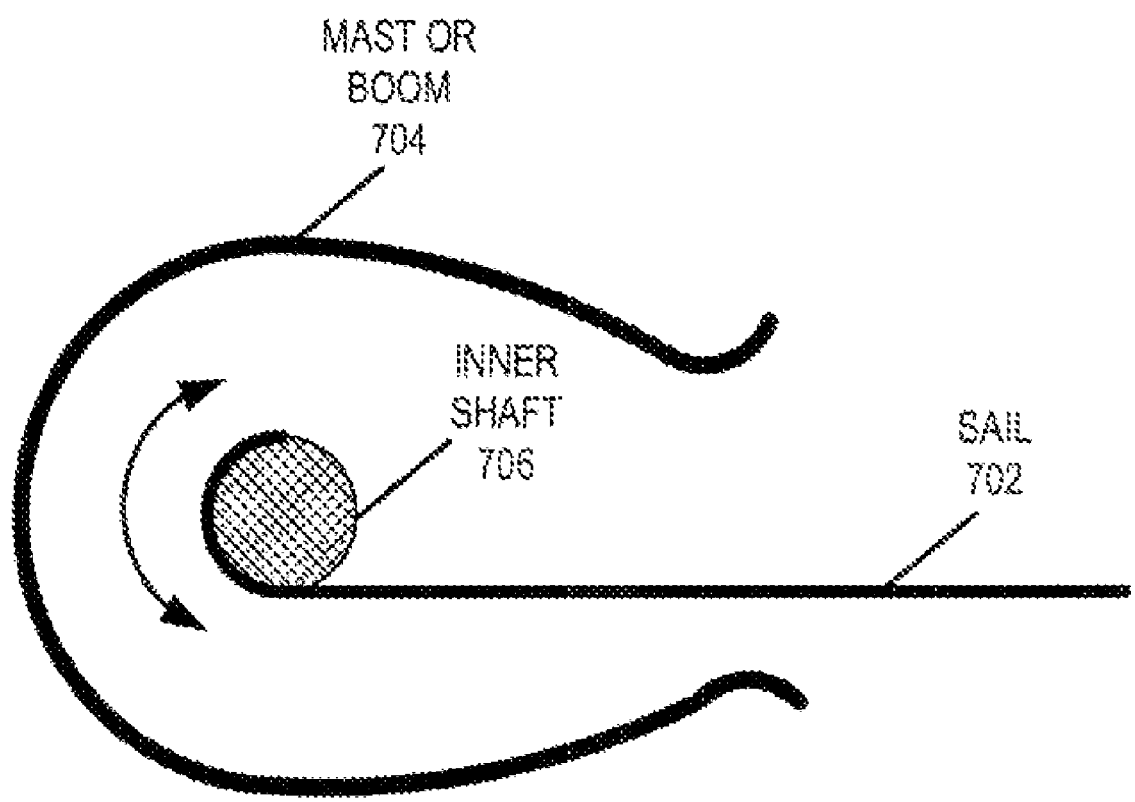
FIG. 7 is a drawing illustrating an exemplary mast or boom/inner shaft/sail structure in accordance with some embodiments of the present invention.

FIG. 7 is a drawing 700 illustrating an exemplary mast or boom/inner shaft/sail structure in accordance with some embodiments of the present invention. Mast or boom 704 includes an inner shaft 706 upon which sail 702 may be rolled in or let out. In some embodiments, the mast and/or boom 704 has a wing shape allowing the wind turbine to capture wind energy even when the sail is completely reefed in. The mast or boom 704 may be mast 504 or boom 506 of FIG. 5; inner shaft 706 may be internal mast shaft 510 or internal boom shaft 512 of FIG. 5; sail 702 maybe sail 508 of FIG. 5.

Figure 10:
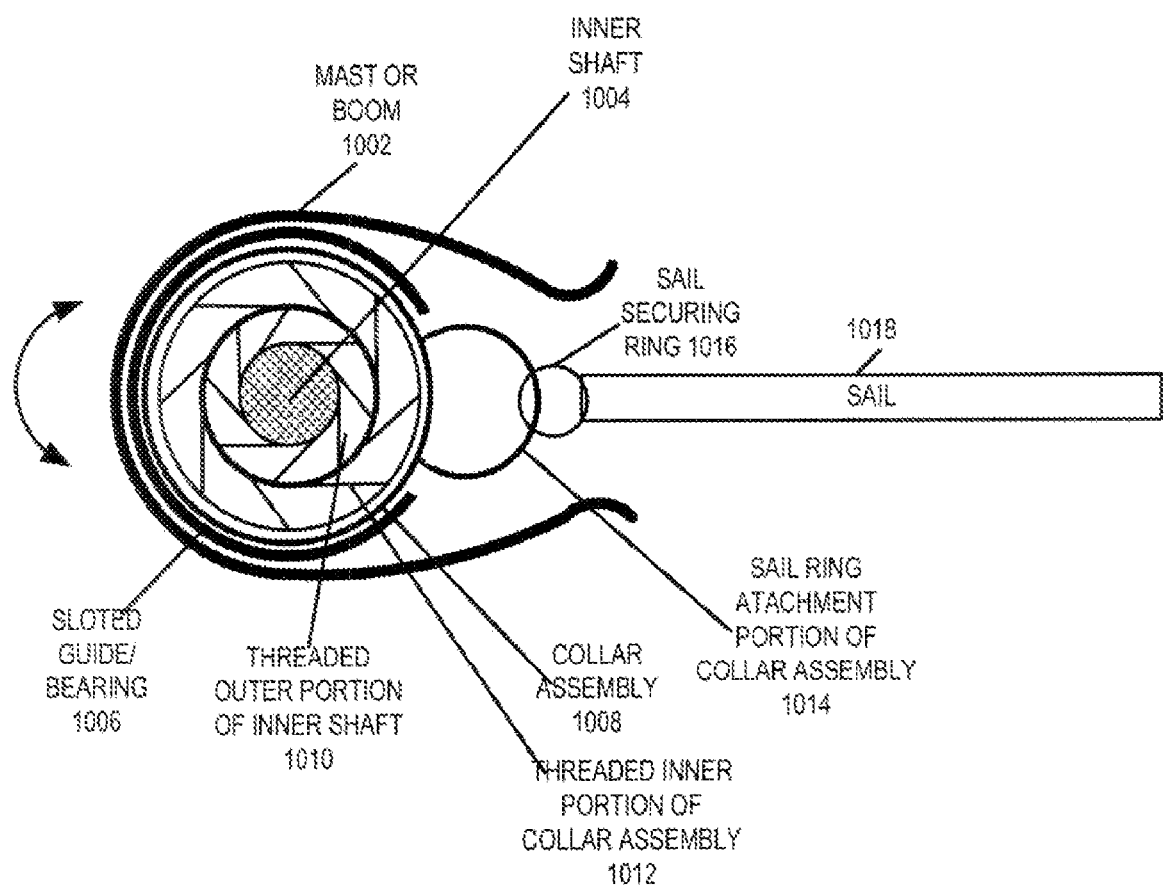
FIG. 10 is a drawing illustrating an exemplary mast or boom/inner shaft/sail structure in accordance with various embodiments of the present invention.

FIG. 10 is a drawing illustrating an exemplary mast or boom/inner shaft/sail structure 1000 in accordance with various embodiments of the present invention. Exemplary structure 1000 includes a mast or boom 1002, inner shaft 1004, slotted guide/bearing 1006, collar assembly 1008, sail securing ring 1016, and sail 1018. Inner shaft 1004 includes a threaded outer portion 1010. Collar assembly 1008 includes a threaded inner portion 1012, and a sail attachment portion 1014. The threaded outer portion of the inner shaft 1010 meshes with the threaded inner portion of the collar assembly 1012. The collar assembly is restricted to the slotted guide/bearing 1006 of the mast or boom 1002. As the inner shaft 1004 rotates as part of the sail deployment operations, the collar assembly moves along the shaft 1004. The sail 1018 is attached to the sail securing ring 1016; the sail securing ring is attached to the sail attachment portion of the collar assembly 1014. As the collar assembly 1014 moves along the inner shaft 1004, the end of the sail is dragged along.

Figure 11:
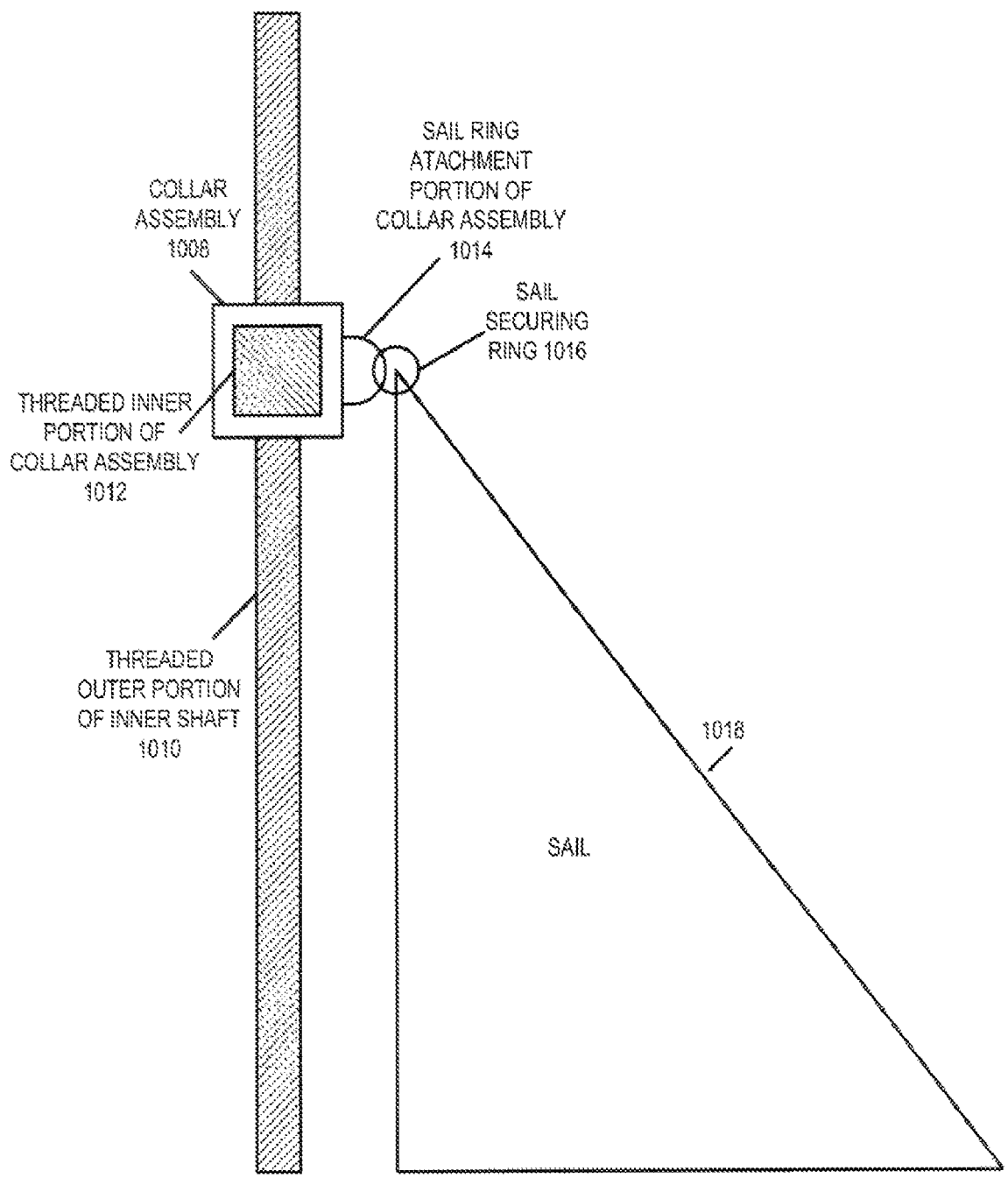
FIG. 11 is a drawing showing some components included in the exemplary structure of FIG. 10 from a different perspective.

FIG. 11 is a drawing 1100 showing some components included in the exemplary structure 1000 of FIG. 10 from a different perspective. Sail 1018 is shown in a partially reefed in state.

Figure 8:
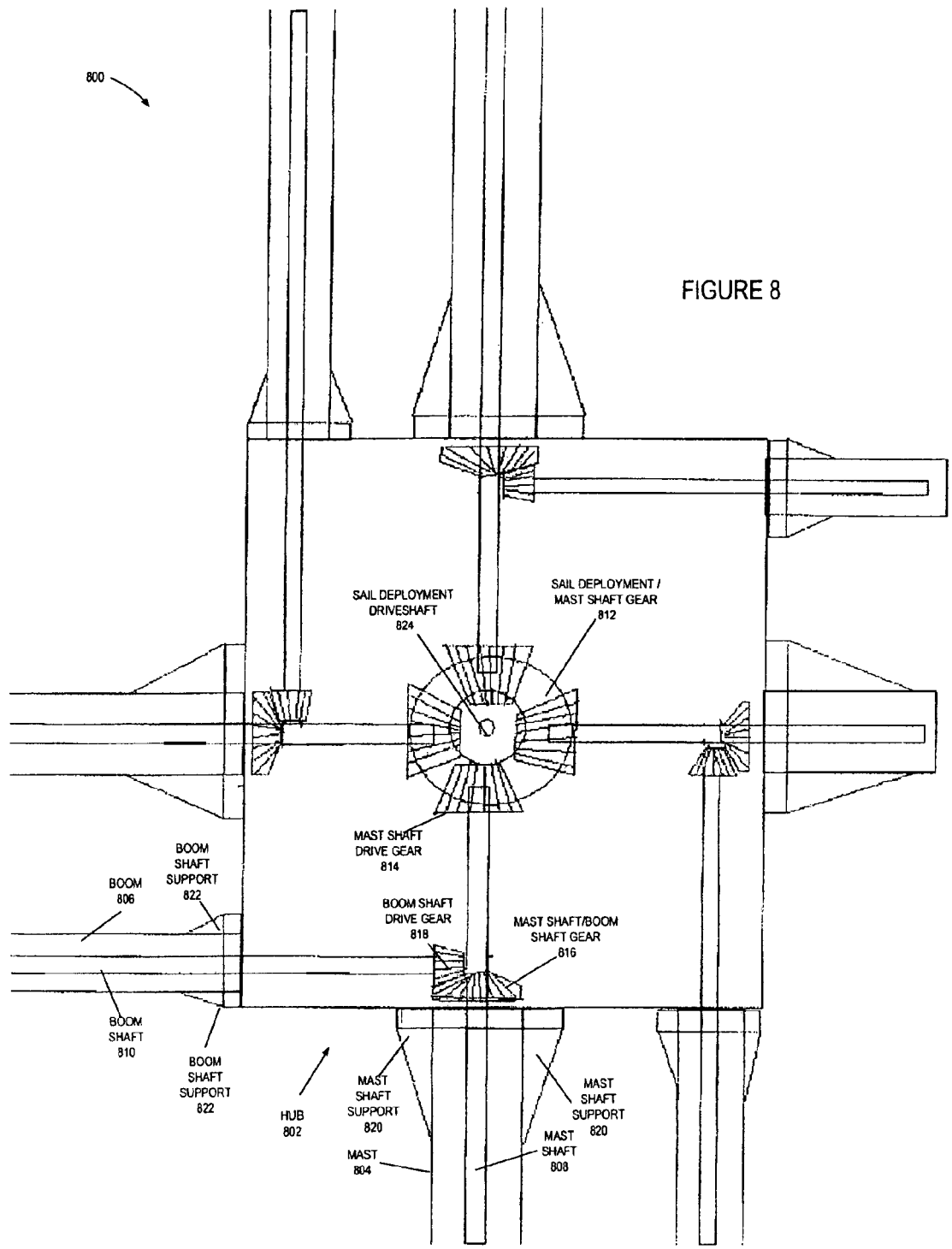
FIG. 8 is a drawing of a head on view of an exemplary hub assembly in accordance with the present invention.

FIG. 8 is a drawing of a head on view of an exemplary hub assembly 800 in accordance with the present invention. Hub assembly 800 may be used in the wind turbine system 100 of FIG. 1. Hub assembly 800 includes hub 802, a sail deployment driveshaft/mast shaft gear 812, four mast shaft drive gears 814, four mast shaft/boom shaft gears 816 and four boom shaft drive gears 818. Masts 804 and booms 806 are attached to the hub 802 via supports 820, 822, respectively. The sail deployment driveshaft 824 is attached to the sail deployment/mast shaft gear 812. As gear 812 rotates, the four mast shaft drive gears 814 are rotated turning the mast shafts 808 to unfurl or reef in the sail. In addition, as the mast shafts rotate, the mast shaft/boom shaft gears 816 are rotated. Gears 816 mesh with boom shaft gears 818; therefore the boom shaft 810 is also rotated in coordination with the rotations of the mast shaft to perform a controlled sail unfurling or sail reefing in operation.

Figure 9:
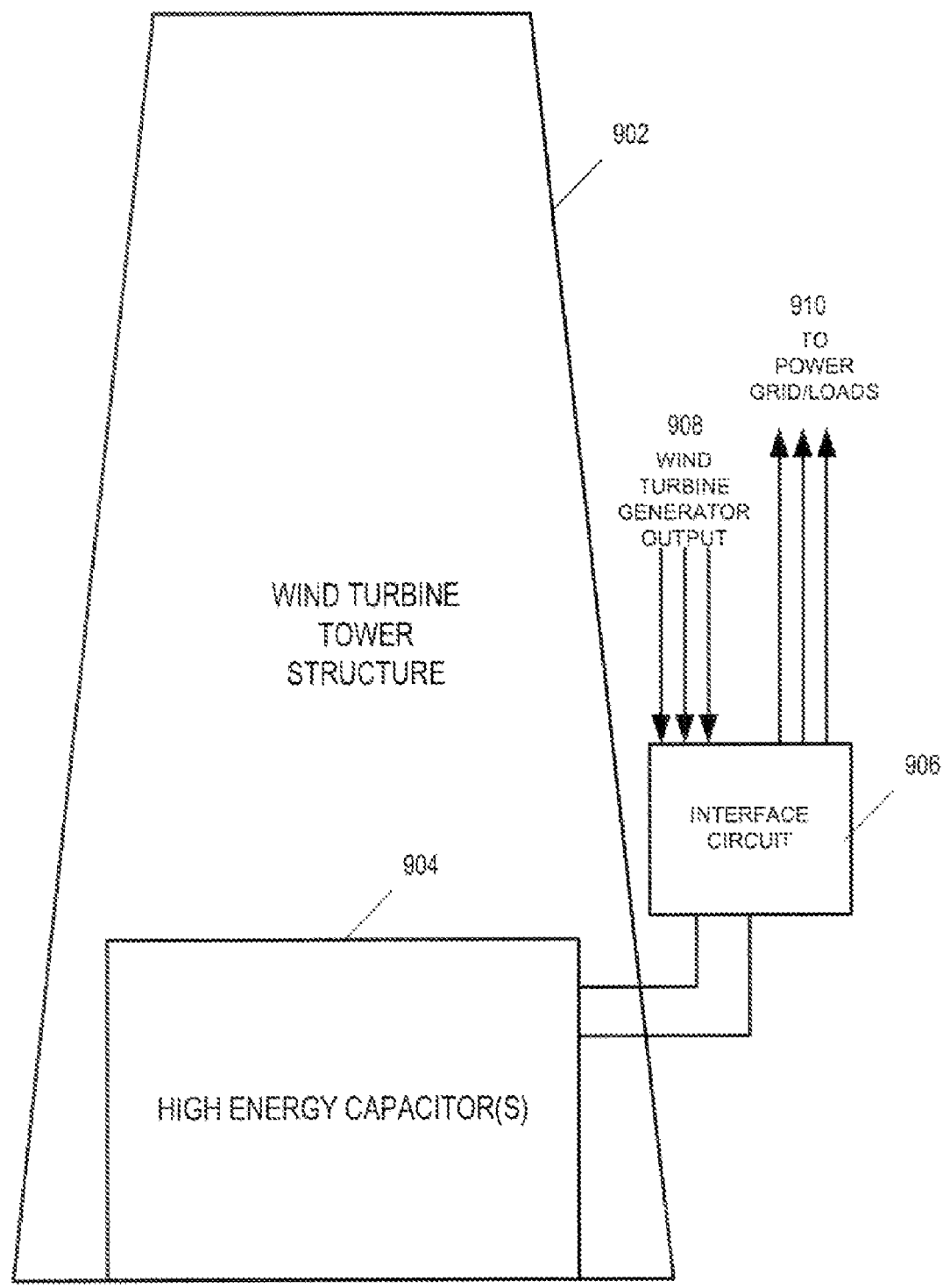
FIG. 9 is a drawing illustrating an energy storage feature in accordance with some embodiments of the present invention.

FIG. 9 is a drawing 900 illustrating an energy storage feature in accordance with some embodiments of the present invention. Wind turbine tower structure 902 includes a high energy capacitor or bank of capacitors 904. The capacitor(s) 904 are electrically coupled to interface circuit 906. Interface circuit 906 may include switching, filtering, and/or conversion circuitry and may be operated under the direction of a computer control module in the wind turbine system, e.g., module 112 of the exemplary system of FIG. 1. The interface circuit 906 is also coupled to the wind turbine generator output 908 and the power grid and/or loads 910. Under conditions where the wind turbine generator output energy generation exceeds electrical energy load requirements, the additional energy may be stored in the high energy capacitor(s) 904. Under conditions where the wind turbine generator energy output is below electrical load requirements or the generator output is zero, then stored energy can be extracted from the capacitors 904 and supplied to the loads.

In some embodiments, hydraulic fluid is displaced in the tower structure for the high energy capacitor or capacitors 904. The high energy capacitor 904, is, e.g., a carbon nanotube capacitor with energy storage densities of 30 kilo-watts per kilogram. The high energy capacitor 904 is, in some embodiments, incorporated into the fluid bath or collocated with the tower. This additional energy storage capacity provided by the high energy capacitor 904, in addition to the energy stored in the high pressure fluid in the high pressure tank, can significantly enhances on-site energy storage capabilities for a wind turbine system in accordance with some embodiments of the present invention. For example, a 30 kilo-watt hour per kilogram carbon nanotube capacitor weighing ten thousand pounds could be charged up during high energy output periods to give a 4 Mega-Watt wind generator system 34 hours of extended output when the generator is unable to produce energy. This energy storage enhancement capability would smooth the energy curve and improve the efficiency of a wind turbine system thus allowing for a larger amount of energy to be sent over the grid to users over time.

While control of sail deployment has been described using a mechanical drive mechanism, an electrical motor driven approach could be used to control sail material deployment and retraction. In one such embodiment, an electrical motor, controlled by electrical signals generated under control of the computer control system as a function of wind velocity, is used to drive the sail deployment in each blade. In one such system, one electrical motor is mounted near the center of the rotor assembly for each blade and used control the deployment of the sail for that blade. Normally, two motors corresponding to blades mounted opposite each other are controlled to cause uniform deployment of sail material and to maintain blade balance.

In various embodiments elements described herein are implemented using one or more modules to perform the steps corresponding to one or more methods of the present invention. Thus, in some embodiments various features of the present invention are implemented using modules. Such modules may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, the present invention is directed to a machine-readable medium including machine executable instructions for causing a machine, e.g., processor and associated hardware which may be part of a test device, to perform one or more of the steps of the above-described method(s).

Numerous additional variations on the methods and apparatus of the present invention described above will be apparent to those skilled in the art in view of the above description of the invention. Such variations are to be considered within the scope of the invention.

What is claimed is:

1. A windmill assembly comprising:
   a blade assembly including a sail;
   a hydraulic pump coupled to said blade assembly;
   a storage tank coupled to said hydraulic pump for storing hydraulic fluid output by said pump under pressure;
   a hydraulic motor hydraulically coupled to said hydraulic pump; and
   a generator coupled to said hydraulic motor.

2. The windmill assembly of claim 1,
   wherein said blade assembly includes a plurality of retractable sails, said sail being one of said plurality of retractable sails.

3. The windmill assembly of claim 2, further comprising:
   a computer control module for controlling sail deployment as a function of wind speed.

4. The windmill assembly of claim 3, further comprising:
   a support tower, said blade assembly and hydraulic pump being located on said support tower.

5. The windmill assembly of claim 3, further comprising:
a wind sensor for detecting wind speed;
a valve positioned between said storage tank and said hydraulic motor; and
a valve control module in said computer module for controlling said valve to supply hydraulic fluid under pressure to said hydraulic pump.

6. The windmill assembly of claim 5, wherein said valve control module includes computer executable instructions to cause said valve to open after said wind sensor indicates at least a predetermined speed to cause said hydraulic pump to act as a drive motor to induce startup rotation of said blade assembly.

7. The windmill assembly of claim 2, wherein said blade assembly includes a plurality of masts, individual sails being retractable into corresponding individual ones of said plurality of masts.

8. The windmill assembly of claim 3, further comprising:
a wind speed sensor; and
wherein said computer control module monitors said speed sensor for wind speeds insufficient to generate electrical power on a continuous basis and generates an alarm after a predetermined amount of insufficient wind speed, said alarm indicating that the ability to generate electrical power from said high pressure hydraulic fluid is expected to stop at a point in time in the future.

9. The windmill assembly of claim 8, further comprising a low pressure fluid tank coupled to an output of said hydraulic motor, the low pressure fluid tank including an inert pressurized gas at the top of said low pressure fluid tank.

10. The windmill assembly of claim 7, wherein said computer control module controls the amount of sail deployment as a function of wind speed.

11. The windmill assembly of claim 3, further comprising:
a wind speed sensor; and
wherein said computer control module dynamically varies the amount of sail deployment in response to changes in detected wind speed.

12. The windmill assembly of claim 11, further comprising a sail drive motor and a gear assembly coupled to said sail drive motor, rotation of said sail drive motor causing said gear assembly to rotate to unroll or roll one of said sails depending on the direction of rotation of said gear assembly.

13. A windmill blade assembly, comprising:
a center hub;
a plurality of first type sail support members extending outward from the center hub, each first type sail support member including an outer housing and a rotatable inner shaft;
a sail secured to the rotatable inner shaft of each of said first type sail support member, said sail being windable around said inner shaft.

14. The windmill blade assembly of claim 13, wherein said outer housing includes a slit opening extending along one side of said outer housing through which the sail attached to said rotatable inner shaft can be retracted and extended.

15. The windmill blade assembly of claim 14, further comprising:
a plurality of second type sail support members, one second type sail support member extending perpendicular to each first type sail support member, each second type support member including a second type inner shaft; and
a plurality of collar assemblies, one collar assembly movably positioned on each of said second type inner shafts.

16. The windmill blade assembly of claim 15, further comprising:
a plurality of sail securing devices, at least one sail securing device per individual collar assembly, for securing the sail corresponding to the first type sail support member corresponding to the individual second type support member on which said individual collar assembly is positioned to the individual collar assembly.

17. The windmill blade assembly of claim 16, wherein said individual collar assemblies move along said corresponding second type inner shaft as the sail attached to the collar assembly moves up and down.

18. The windmill blade assembly of claim 13, wherein the blade assembly includes an even number of first type sail support members and a corresponding number of retractable sails.

19. The windmill blade assembly of claim 18,
wherein each of the first type sail support members has a curved solid outer portion and a slot opposite said curved solid outer portion, said slot and said curved solid outer portion extending outward from said center hub.

20. The windmill blade assembly of claim 19, wherein the rotatable inner shaft of each first type sail support member includes a thread hub located at the end of the shaft, said threaded hub contacting a drive gear used to control rotation of the rotatable inner shaft to which the threaded hub is attached.

* * * * *